(12) United States Patent
Tung

(10) Patent No.: US 11,023,611 B2
(45) Date of Patent: *Jun. 1, 2021

(54) SYSTEMS AND METHODS FOR TRIGGER-BASED MODIFICATION OF PRIVACY SETTINGS ASSOCIATED WITH POSTS

(71) Applicant: Facebook, Inc., Menlo Park, CA (US)

(72) Inventor: Yen-Ting Tung, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 49 days.

This patent is subject to a terminal disclaimer.

(21) Appl. No.: 15/712,123

(22) Filed: Sep. 21, 2017

(65) Prior Publication Data

US 2018/0025178 A1    Jan. 25, 2018

Related U.S. Application Data

(63) Continuation of application No. 14/853,800, filed on Sep. 14, 2015, now Pat. No. 9,792,457.

(51) Int. Cl.
| | | |
|---|---|---|
| *G06F 21/62* | (2013.01) | |
| *H04L 29/06* | (2006.01) | |
| *H04W 12/02* | (2009.01) | |
| *G06Q 50/00* | (2012.01) | |

(52) U.S. Cl.
CPC ........ *G06F 21/6245* (2013.01); *H04L 63/101* (2013.01); *H04W 12/02* (2013.01); *G06Q 50/01* (2013.01); *H04L 63/0407* (2013.01)

(58) Field of Classification Search
CPC .............. G06F 21/6245; H04L 63/101; H04L 63/0407; G06Q 50/01; H04W 12/02
See application file for complete search history.

(56) References Cited

U.S. PATENT DOCUMENTS

| | | | |
|---|---|---|---|
| 8,234,688 B2 * | 7/2012 | Grandison | ............. G06Q 50/01 726/1 |
| 8,370,895 B2 | 2/2013 | DiCrescenzo | |
| 8,752,186 B2 | 6/2014 | Vernal | |
| 8,832,567 B1 | 9/2014 | Jing | |
| 8,955,153 B2 | 2/2015 | Altaf | |
| 9,110,929 B2 | 8/2015 | Garcia et al. | |
| 9,177,346 B2 | 11/2015 | Ahrens et al. | |

(Continued)

FOREIGN PATENT DOCUMENTS

| | | |
|---|---|---|
| CN | 102971762 A | 3/2013 |
| CN | 103595818 A | 2/2014 |
| CN | 104756514 A | 7/2015 |

OTHER PUBLICATIONS

European Patent Application No. 16158625.0, Search Report dated Jun. 15, 2016.

(Continued)

*Primary Examiner* — Baotran N To
(74) *Attorney, Agent, or Firm* — Sheppard Mullin Richter & Hampton LLP

(57) ABSTRACT

Systems, methods, and non-transitory computer-readable media can identify a post to be published via a social networking system. A privacy schedule for modifying a privacy setting associated with the post can be determined. A trigger to modify the privacy setting associated with the post can be detected. The privacy setting can be modified based on the privacy schedule when the trigger is detected.

19 Claims, 9 Drawing Sheets

(56) References Cited

U.S. PATENT DOCUMENTS

| | | | |
|---|---|---|---|
| 9,792,457 B2* | 10/2017 | Tung | G06F 21/6245 |
| 2008/0134294 A1* | 6/2008 | Mattox | G06F 21/6245 |
| | | | 726/4 |
| 2009/0070334 A1 | 3/2009 | Callahan | |
| 2010/0257577 A1 | 10/2010 | Grandison | |
| 2010/0318571 A1* | 12/2010 | Pearlman | H04L 63/104 |
| | | | 707/784 |
| 2011/0004922 A1* | 1/2011 | Bono | G06F 21/6263 |
| | | | 726/4 |
| 2011/0023129 A1* | 1/2011 | Vernal | G06F 21/6245 |
| | | | 726/28 |
| 2011/0197255 A1 | 8/2011 | DiCrescenzo | |
| 2012/0131183 A1* | 5/2012 | Heidt | H04L 67/22 |
| | | | 709/224 |
| 2012/0158851 A1* | 6/2012 | Kelmenson | G06F 16/951 |
| | | | 709/205 |
| 2012/0331396 A1 | 12/2012 | Coletrane | |
| 2013/0276134 A1 | 10/2013 | Meredith et al. | |
| 2014/0280537 A1 | 9/2014 | Pridmore | |
| 2015/0101022 A1* | 4/2015 | Zent | H04L 63/104 |
| | | | 726/4 |
| 2016/0180113 A1* | 6/2016 | Patton | G06F 16/9535 |
| | | | 726/28 |

OTHER PUBLICATIONS

International Application No. PCT/US2015/050290, International Search Report and Written Opinion dated Jun. 10, 2016.
Indian Patent Application No. 201847009332, Examination Report dated Feb. 2, 2021, 5 pages.
Chinese Patent Application No. 201580084529.9, Office Action dated Feb. 26, 2021, 7 pages.

* cited by examiner

SYSTEMS AND METHODS FOR TRIGGER-BASED MODIFICATION OF PRIVACY SETTINGS ASSOCIATED WITH POSTS

CROSS-REFERENCE TO RELATED APPLICATIONS

This application is a continuation of U.S. patent application Ser. No. 14/853,800, filed on Sep. 14, 2015 and entitled "SYSTEMS AND METHODS FOR TRIGGER-BASED MODIFICATION OF PRIVACY SETTINGS ASSOCIATED WITH POSTS", which is incorporated herein by reference in its entirety.

FIELD OF THE INVENTION

The present technology relates to the field of content privacy. More particularly, the present technology relates to techniques for providing trigger-based modification of privacy settings associated with posts.

BACKGROUND

Today, people often utilize computing devices (or systems) for a wide variety of purposes. Users can use their computing devices to, for example, interact with one another, access content, share content, and create content. In some cases, users of a social networking system (or service) can utilize their computing devices to create, edit, and share posts, such as by publishing media content items on their social networking profiles, timelines, walls, or feeds.

Under conventional approaches rooted in computer technology, posts made by users can often times be associated with privacy settings for determining who can view or access such posts. In one example, a post shared by a user can have a privacy setting enabling the post to be accessible to the public in general. In this example, another post shared by the user can have another privacy setting that enables this other post to be accessible only to one or more selected audience members. However, under such conventional approaches to sharing or publishing posts, the utilization of privacy settings for posts can be inefficient, unnecessarily static, or otherwise undesirable. As such, conventional approaches can create challenges for or reduce the overall user experience associated with sharing, publishing, or positing content.

SUMMARY

Various embodiments of the present disclosure can include systems, methods, and non-transitory computer readable media configured to identify a post to be published via a social networking system. A privacy schedule for modifying a privacy setting associated with the post can be determined. A trigger to modify the privacy setting associated with the post can be detected. The privacy setting can be modified based on the privacy schedule when the trigger is detected.

In an embodiment, the post can be published via the social networking system prior to detecting the trigger. The post can be enabled, based on the privacy setting prior to being modified, to be accessible by a first set of one or more entities. The first set can be defined based on the privacy schedule. The post can be enabled, based on the privacy setting subsequent to being modified, to be accessible by a second set of one or more entities. The second set can be defined based on the privacy schedule.

In an embodiment, the first set can be larger than the second set.

In an embodiment, the second set can be larger than the first set.

In an embodiment, at least one of the first set or the second set can be defined further based on one or more social engagement signals.

In an embodiment, a second trigger to change the privacy setting associated with the post can be detected. The privacy setting can be changed based on the privacy schedule when the second trigger is detected. The post can be enabled, based on the privacy setting subsequent to being changed, to be accessible by a third set of one or more entities. The third set can be defined based on the privacy schedule.

In an embodiment, the post can be created by a user of the social networking system. The first set can include a public audience. The second set can include a set of social connections associated with the user. The third set can include a selected subset of social connections associated with the user.

In an embodiment, the post can be created by a user of the social networking system. The first set can include a set of social connections associated with the user. The second set can include a selected subset of social connections associated with the user. The third set can include the user.

In an embodiment, the post can be created by a user of the social networking system. The privacy schedule can be determined based on at least one of a set of system settings or a set of commands from the user.

In an embodiment, the trigger can be associated with at least one of a specified duration of elapsed time or an occurrence of an event.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
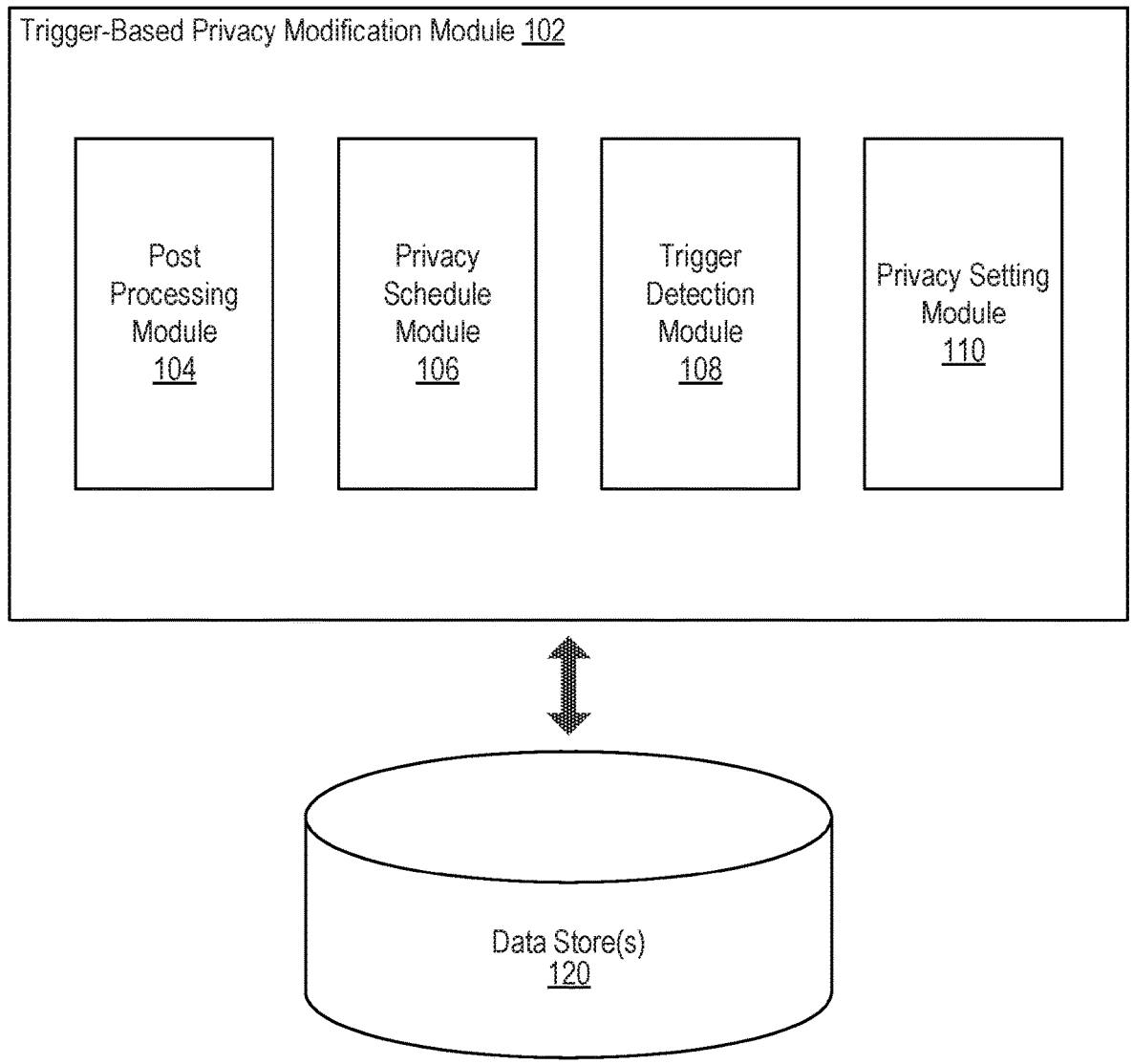
FIG. 1 illustrates an example system including an example trigger-based privacy modification module configured to facilitate providing trigger-based modification of privacy settings associated with posts, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Trigger-Based Modification of Privacy Settings Associated with Posts

People use social networking systems (or services) for various purposes. Users of a social networking system can utilize their computing devices (or systems) to establish connections, communicate, and interact with one another via the social networking system. Users can also provide, edit, share, or access media content items such as pictures, videos, audio, and text. In one instance, a user can utilize his or her computing device to create a post to be shared or published via the social networking system. In this instance, the user can select, set, or specify a privacy setting associated with the post to be shared or published. The privacy setting can indicate or identify a target audience to whom the post is accessible.

Under conventional approaches rooted in computer technology, sharing or publishing posts generally requires users to create posts, set or define privacy settings for the posts, and then submit the posts to be published or shared in accordance with the privacy settings. However, in accordance with conventional approaches, the privacy settings for the posts will typically remain the same perpetually. In one example, if users change their minds about who are allowed to access their posts, then those users have to remove the posts or manually edit the privacy settings for the posts. In some cases, users may forget to remove some posts or change the privacy settings of those posts, and thus certain entities who the users may no longer wish to have access to those posts would still be able to access those posts. Accordingly, conventional approaches to sharing or publishing posts can be inefficient or inconvenient. Moreover, under conventional approaches, users may often times hesitate to share or publish posts because of privacy issues.

Due to these or other concerns, conventional approaches can be disadvantageous or undesirable. Therefore, an improved approach can be beneficial for addressing or alleviating various drawbacks associated with conventional approaches. Based on computer technology, the disclosed technology can provide trigger-based modification of privacy settings associated with posts. Various embodiments of the present disclosure can identify a post to be published via a social networking system. A privacy schedule for modifying a privacy setting associated with the post can be determined. A trigger to modify the privacy setting associated with the post can be detected. The privacy setting can be modified based on the privacy schedule when the trigger is detected. It is contemplated that there can be many variations and/or other possibilities associated with the disclosed technology.

FIG. 1 illustrates an example system 100 including an example trigger-based privacy modification module 102 configured to facilitate providing trigger-based modification of privacy settings associated with posts, according to an embodiment of the present disclosure. As shown in the example of FIG. 1, the trigger-based privacy modification module 102 can include a post processing module 104, a privacy schedule module 106, a trigger detection module 108, and a privacy setting module 110. In some instances, the example system 100 can include at least one data store 120. The components (e.g., modules, elements, etc.) shown in this figure and all figures herein are exemplary only, and other implementations may include additional, fewer, integrated, or different components. Some components may not be shown so as not to obscure relevant details.

In some embodiments, the trigger-based privacy modification module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the trigger-based privacy modification module 102 can be implemented, in part or in whole, as software running on one or more computing devices or systems, such as on a user or client computing device. For example, the trigger-based privacy modification module 102 or at least a portion thereof can be implemented as or within an application (e.g., app), a program, an applet, or an operating system, etc., running on a user computing device or a client computing system, such as the user device 710 of FIG. 7. In another example, the trigger-based privacy modification module 102 or at least a portion thereof can be implemented using one or more computing devices or systems that include one or more servers, such as network servers or cloud servers. In some instances, the trigger-based privacy modification module 102 can, in part or in whole, be implemented within or configured to operate in conjunction with a social networking system (or service), such as the social networking system 730 of FIG. 7. It should be understood that there can be many variations or other possibilities.

The post processing module 104 can be configured to facilitate handling various tasks or performing various operations associated with posts to be shared or published within a social networking system. In some implementations, the post processing module 104 can be configured to facilitate identifying a post to be published (or shared) via the social networking system. In one example, a user of a computing device (or system) can utilize the computing device to access the social networking system and to share or publish a post, such as by posting a media content item (e.g., an image, a video, an audio, text, etc.). In this example, the user can initiate a post creation tool, such as a composer element, a comment box, or a content upload tool, etc. The post creation tool can enable the user to create a particular post to be shared, published, or posted via the social networking system. In this example, the post processing module 104 can be configured to identify this particular post to be created, shared, published, or posted by the user via the social networking system. In another example, the post processing module 104 can be configured to identify a post selected based on a system setting or a default configuration, such as by identifying each post previously posted by the user and/or each new post made by the user. It should be understood that all examples herein are provided for illustrative purposes and that many variations associated with the disclosed technology are possible.

In some embodiments, the post processing module 104 can also be configured to facilitate publishing the post via the social networking system. For instance, when the user has finished creating or providing content for a particular post (e.g., finished inputting text, finished selecting media content to be uploaded, etc.), the user can tap, click, or otherwise activate a user interface element, such as a "Submit" button, a "Post" button, etc. As a result, the post processing module 104 can publish, share, or broadcast the post via the social networking system, thereby enabling the post to be accessible to its intended audience. As discussed previously, it should be appreciated that there can be many variations for the disclosed technology.

The privacy schedule module 106 can be configured to facilitate determining a privacy schedule for modifying a privacy setting associated with the post. For instance, the privacy schedule module 106 can define, develop, acquire, or receive, etc., a privacy schedule for a given post. The privacy schedule can indicate or specify how the privacy setting of the given post will change or be modified over time. More details regarding the privacy schedule module 106 will be provided below with reference to FIG. 2A.

Moreover, the trigger detection module 108 can be configured to facilitate detecting a trigger to modify the privacy setting associated with the post. In some cases, the trigger can be user specified and/or can be based on system settings. In one example, the trigger can occur when a specified duration of time has elapsed. In another example, the trigger can arise when the occurrence of a specified event has been detected. The trigger detection module 108 will be discussed in more detail with reference to FIG. 2B.

Additionally, the privacy setting module 110 can be configured to facilitate modifying the privacy setting based on the privacy schedule when the trigger is detected. For instance, in response to the trigger being detected by the trigger detection module 108, the privacy setting module 110 can automatically change, edit, or modify the privacy setting for a particular post in accordance with the privacy schedule for the particular post.

In some implementations, the privacy setting module 110 can be configured to enable, based on the privacy setting prior to being modified, the post to be accessible by a first set of one or more entities. The first set can be defined, by the privacy schedule module 106, based on the privacy schedule. In some embodiments, the privacy setting module 110 can also be configured to enable, based on the privacy setting subsequent to being modified, the post to be accessible by a second set of one or more entities. The privacy schedule module 106 can define the second set based on the privacy schedule.

In some cases, the privacy setting module 110 can also facilitate presenting the privacy setting for the post. In one example, if the user who created the post taps on, clicks on, hovers over, or otherwise interacts with a privacy setting icon associated with the post, the privacy setting module 110 can indicate or display the intended audience to whom the post is currently accessible. Similarly, if an audience member (who currently has access to the post) taps on, clicks on, hovers over, or otherwise interacts with the privacy setting icon, the privacy setting module 110 can also indicate or display the intended audience to whom the post is currently accessible. As discussed, it should be understood that all examples herein are provided for illustrative purposes and that many variations are possible.

Furthermore, in some embodiments, the trigger-based privacy modification module 102 can be configured to communicate and/or operate with the at least one data store 120, as shown in the example system 100. The at least one data store 120 can be configured to store and maintain various types of data. In some implementations, the at least one data store 120 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 120 can store information associated with users, such as user identifiers, user information, profile information, user locations, user specified settings, content produced or posted by users, and various other types of user data. In some embodiments, the at least one data store 120 can store information that is utilized by the trigger-based privacy modification module 102. Again, it is contemplated that there can be many variations or other possibilities.

Figure 2A:
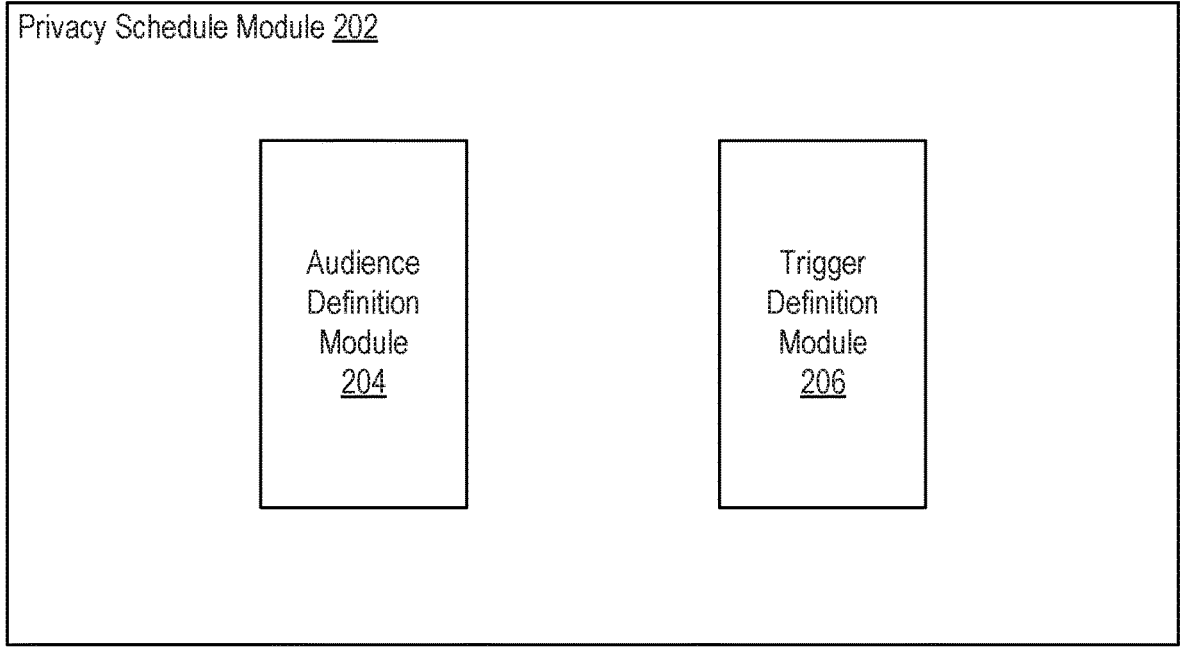
FIG. 2A illustrates an example privacy schedule module configured to facilitate providing trigger-based modification of privacy settings associated with posts, according to an embodiment of the present disclosure.

FIG. 2A illustrates an example privacy schedule module 202 configured to facilitate providing trigger-based modification of privacy settings associated with posts, according to an embodiment of the present disclosure. In some embodiments, the privacy schedule module 106 of FIG. 1 can be implemented as the example privacy schedule module 202. As shown in FIG. 2A, the privacy schedule module 202 can include an audience definition module 204 and a trigger definition module 206.

As discussed previously, the privacy schedule module 202 can be configured to facilitate determining a privacy schedule for modifying a privacy setting associated with a post, such as a post created by a user of a social networking system. The privacy schedule module 202 can, for example, define, develop, acquire, or receive, etc., the privacy schedule for the post. The privacy schedule can indicate or specify how the privacy setting of the post is to change or be modified over time. In some cases, the privacy schedule can be determined (e.g., defined, developed, acquired, received, etc.) based on at least one of: 1) a set of one or more system settings or 2) a set of one or more commands from the user. In one instance, the privacy schedule for a post can be set or defined by one or more default configurations. In another instance, the user can set or define the privacy schedule for a post. Many variations are possible.

In some embodiments, the privacy schedule module 202 can utilize the audience definition module 204 to define, indicate, or specify, via a privacy setting of a post, to which audience members the post is to be accessible. In some embodiments, the privacy schedule module 202 can utilize the trigger definition module 206 to define, indicate, or specify when the privacy setting for the post is to change or be modified. The trigger definition module 206 can, for instance, acquire one or more user instructions and/or system settings, which can then be utilized to define or set one or more triggers. In some cases, a trigger can be defined to occur when a specified duration of time has elapsed. In some instances, a trigger can arise when the occurrence of a specified event (e.g., a relationship status update, a graduation of school, a school application period, a job application period, a user customized event, etc.) has been detected. Accordingly, if and when the privacy setting for the post is changed or modified, such as in response to a detected occurrence of a trigger defined by the trigger definition module 206, the audience definition module 204 can indicate or identify, via the changed/modified privacy setting, a new or different group of audience members who can access the particular post.

In one example, a post can be enabled, based on a privacy setting prior to being modified, to be accessible by a first set of one or more entities (e.g., users, organizations, groups, page admins, representatives, etc.). The first set can be defined, by the audience definition module 204, based on the privacy schedule. Continuing with this example, the privacy setting can then be modified or changed subsequent to the trigger being detected. The post can then be enabled, based on the privacy setting subsequent to being modified, to be accessible by a second set of one or more entities. The audience definition module 204 can also define the second set based on the privacy schedule.

In some cases, the first set can be defined to be larger than the second set. The user may desire to share or post content to a target audience, but may want to narrow the target audience over time. In one example, the first set can include the general public and the second set can include only friends or social connections of the user (and including the user as well). In another example, the first set can include only friends of the user and the second set can include only selected friends (e.g., close friends, friends in a selected group, family members, etc.) of the user. In a further example, the first set can include only selected friends and the second set can include only the user. There can be many variations.

Furthermore, in some cases, the second set can be defined to be larger than the first set. For many occasions, such as with engagements, weddings, births, etc., the user may desire to reveal posted content first to a smaller audience before expanding the accessibility of the posted content to a larger audience. In one instance, the first set can include only the user and the second set can include only selected friends of the user. In another instance, the first set can include only selected friends of the user and the second set can include all friends of the user. In a further example, the first set can include friends of the user and the second set can include the general public. Again, many variations are possible.

In some implementations, at least one of the first set or the second set can be defined further based on one or more social engagement signals. For example, if an entity has a higher social affinity or social coefficient metric (e.g., one that at least meets a specified threshold) with respect to the user, then the entity can be included in at least one set. In another example, if an entity has liked, commented on, or shared at least a specified threshold amount of other posts by the user (or if the user has liked, commented on, or shared at least a specified threshold amount of posts by the entity), then the entity can be included in at least one set. In a further example, if the entity does not often socially interact or engage with the user (e.g., the entity's social engagement level with respect to the user does not meet a specified threshold), then the entity can be excluded from one or more sets (e.g., excluded from both sets, excluded from the second set but included in the first set, etc.). As discussed previously, all examples herein are provided for illustrative purposes and there can be many variations or other possibilities associated with the disclosed technology.

Figure 2B:
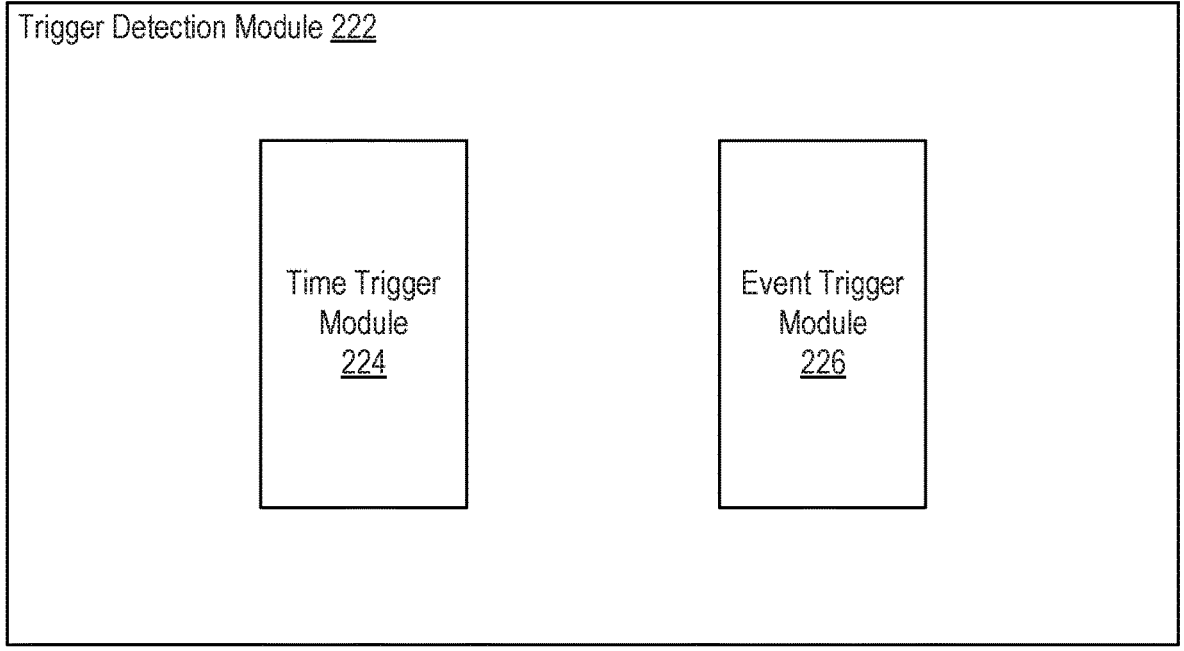
FIG. 2B illustrates an example trigger detection module configured to facilitate providing trigger-based modification of privacy settings associated with posts, according to an embodiment of the present disclosure.

FIG. 2B illustrates an example trigger detection module 222 configured to facilitate providing trigger-based modification of privacy settings associated with posts, according to an embodiment of the present disclosure. In some embodiments, the trigger detection module 108 of FIG. 1 can be implemented as the example trigger detection module 222. As shown in FIG. 2B, the trigger detection module 222 can include a time trigger module 224 and an event trigger module 226.

As discussed above, the trigger detection module 222 can facilitate detecting a trigger to modify a privacy setting associated with a post. Triggers can, for instance, be user specified and/or can be based on one or more system settings. In one example, a trigger can be associated with at least one of a specified duration of elapsed time or an occurrence of an event. The trigger detection module 222 can utilize the time trigger module 224 to detect one or more time-based triggers. The time trigger module 224 can detect that a particular trigger associated with a particular specified duration of time has arisen when the particular specified duration of time has elapsed or passed. The trigger detection module 222 can also utilize the event trigger module 226 to detect one or more event-based triggers. The event trigger module 226 can detect that a particular trigger associated with a particular specified event has arisen when the particular specified event is determined to have initiated or occurred.

Furthermore, the trigger detection module 222 can be configured to detect multiple triggers. In one example, a post created by a user can be accessible by a first set of one or more entities. The first set can be defined based on the privacy schedule. The trigger detection module 222 can then detect a first trigger to modify a privacy setting associated with the post. The privacy setting can be modified based on a privacy schedule when the first trigger is detected. Then the post can be enabled, based on the privacy setting subsequent to being modified, to be accessible by a second set of one or more entities. The second set can be defined based on the privacy schedule. Continuing with this example, the trigger detection module 222 can also detect a second trigger to change or modify (again) the privacy setting associated with the post. The privacy setting can be changed based on the privacy schedule when the second trigger is detected. The post can be enabled, based on the privacy setting subsequent to being changed, to be accessible by a third set of one or more entities. The third set can be defined based on the privacy schedule. In some cases, this process can be repeated for a third trigger and a fourth set of entities, and so forth. Many variations are possible.

In one example, the first set can include a public audience. The second set can include a set of social connections associated with the user. The third set can include a selected subset of social connections associated with the user. In another example, the first set can include a set of social connections associated with the user. The second set can include a selected subset of social connections associated with the user. The third set can include the user. As discussed previously, it should be appreciated that all examples herein are provided for illustrative purposes and that many variations are possible.

Figure 3:
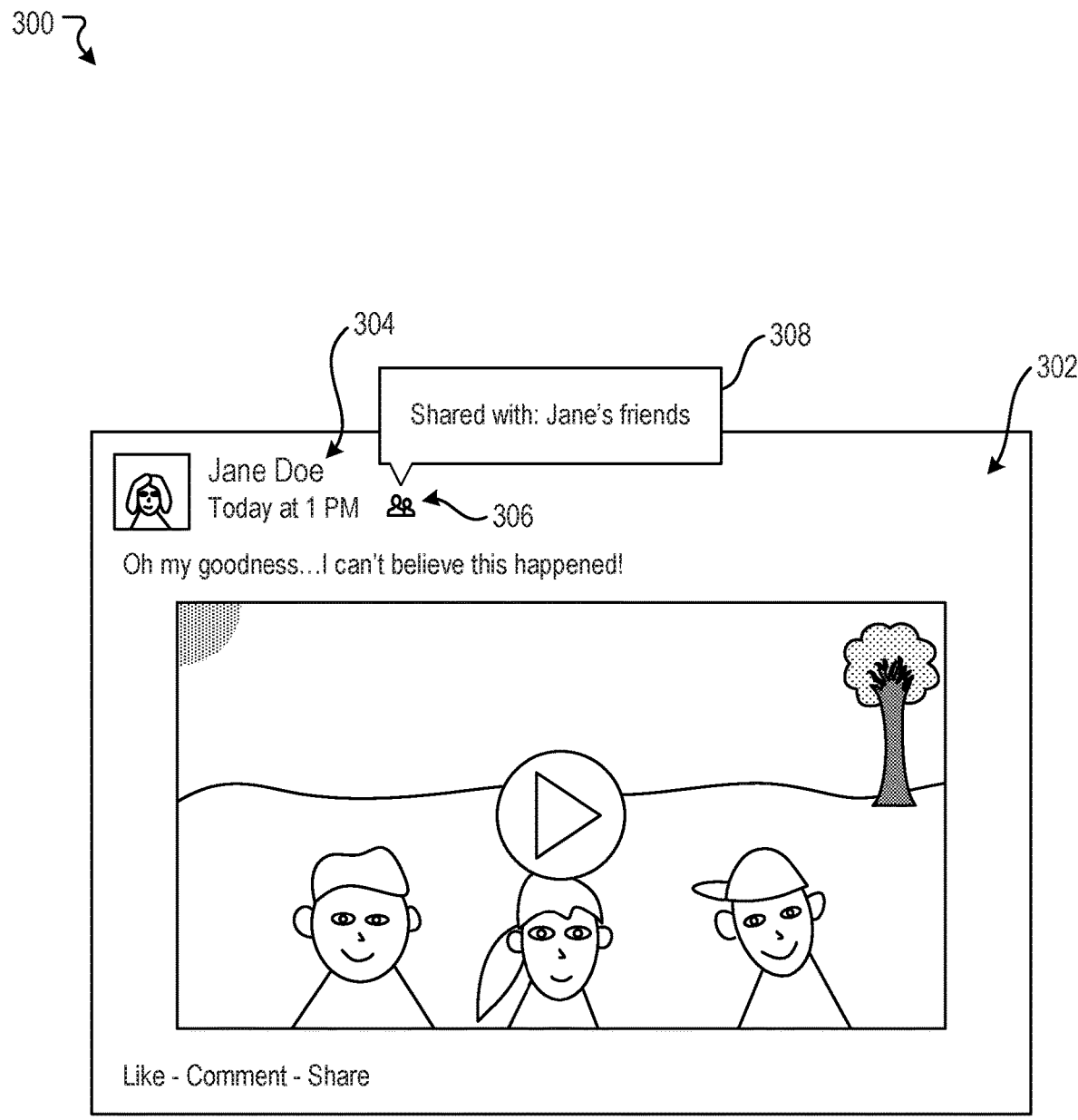
FIG. 3 illustrates an example scenario associated with providing trigger-based modification of privacy settings associated with posts, according to an embodiment of the present disclosure.

FIG. 3 illustrates an example scenario 300 associated with providing trigger-based modification of privacy settings associated with posts, according to an embodiment of the present disclosure. The example scenario 300 of FIG. 3 illustrates an example post 302, such as a content item created by a user 304 (Jane Doe). The user 304 can share or publish the post 302 via a social networking system.

In this example scenario 300, the disclosed technology has determined a privacy schedule for modifying a privacy setting associated with the post 302. In this example, the privacy schedule can specify that the privacy setting will initially enable or permit the user's friends or social connections to view or access the post 302. However, the privacy schedule can further specify that, after a month, the privacy setting will be modified to enable or allow only the user 304 to view or access the post 302. As such, the example post 302 can include a privacy setting icon 306 that, when interacted with (e.g., clicked on, tapped on, hovered over, etc.), will provide a prompt or a message 308 indicating that only the user's friends can view or access the post 302. It is contemplated that many variations are possible.

Figure 4:
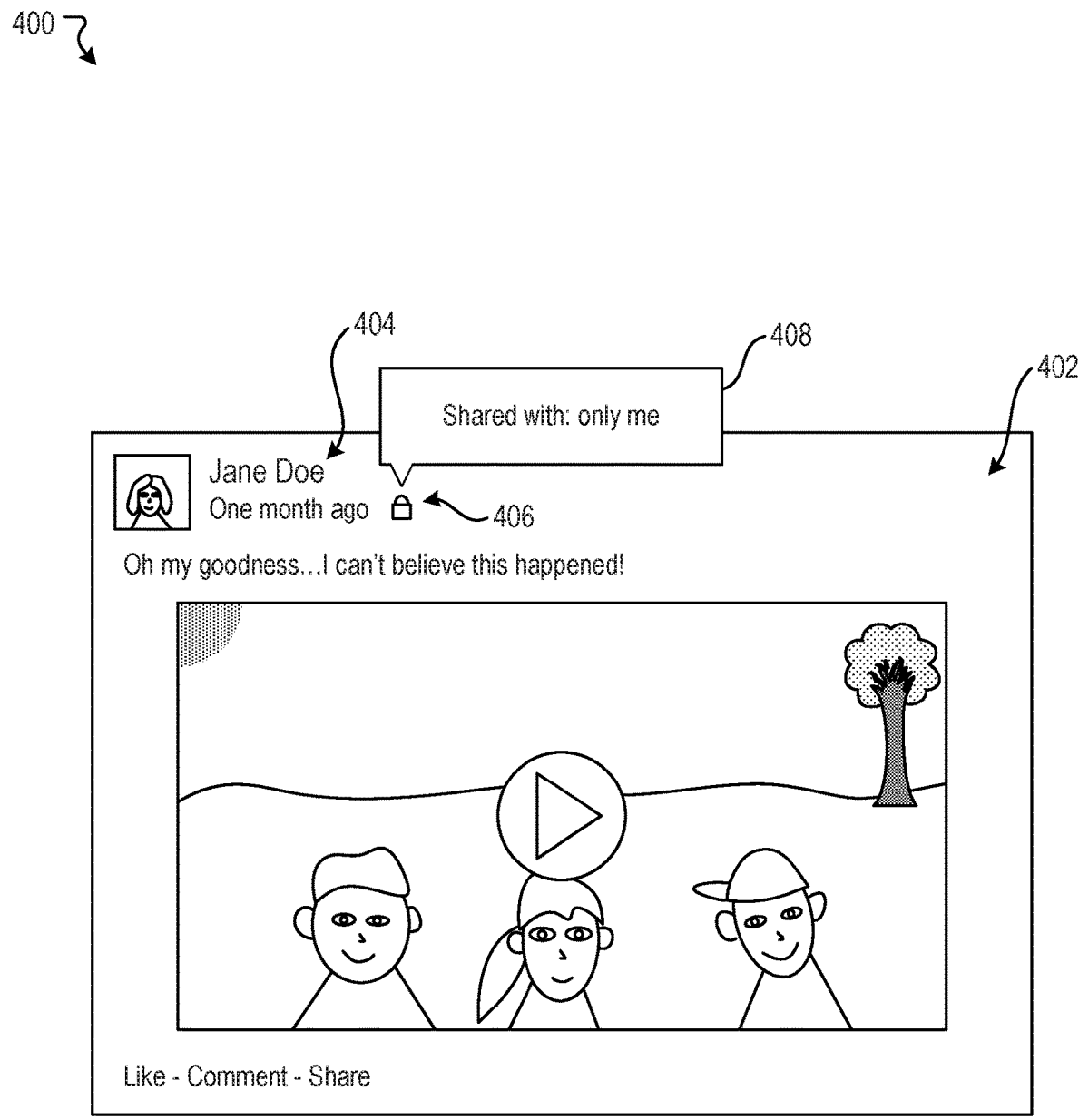
FIG. 4 illustrates an example scenario associated with providing trigger-based modification of privacy settings associated with posts, according to an embodiment of the present disclosure.

FIG. 4 illustrates an example scenario 400 associated with providing trigger-based modification of privacy settings associated with posts, according to an embodiment of the present disclosure. The example scenario 400 illustrates an example post 402, such as the post 302 of FIG. 3. The example post 402 of FIG. 4 can be posted, shared, or published by a user 402 (Jane Doe), such as the user 304 of FIG. 3.

In the example scenario 400 of FIG. 4, the disclosed technology has detected a trigger defined based on a privacy schedule for the post 402. In this example, the trigger can correspond to a passage of a month's time. As a result, the privacy setting associated with the post 402 can be modified based on the privacy schedule since the trigger has been detected. In this example, the privacy schedule can specify that the privacy setting will be modified to enable or allow only the user 404 to view or access the post 402. Accordingly, the example post 402 can include a privacy setting icon 406 that, when interacted with, will provide a prompt or a message 408 indicating that only the user 404 can view or access the post 402. There can be many variations or other possibilities.

Figure 5:
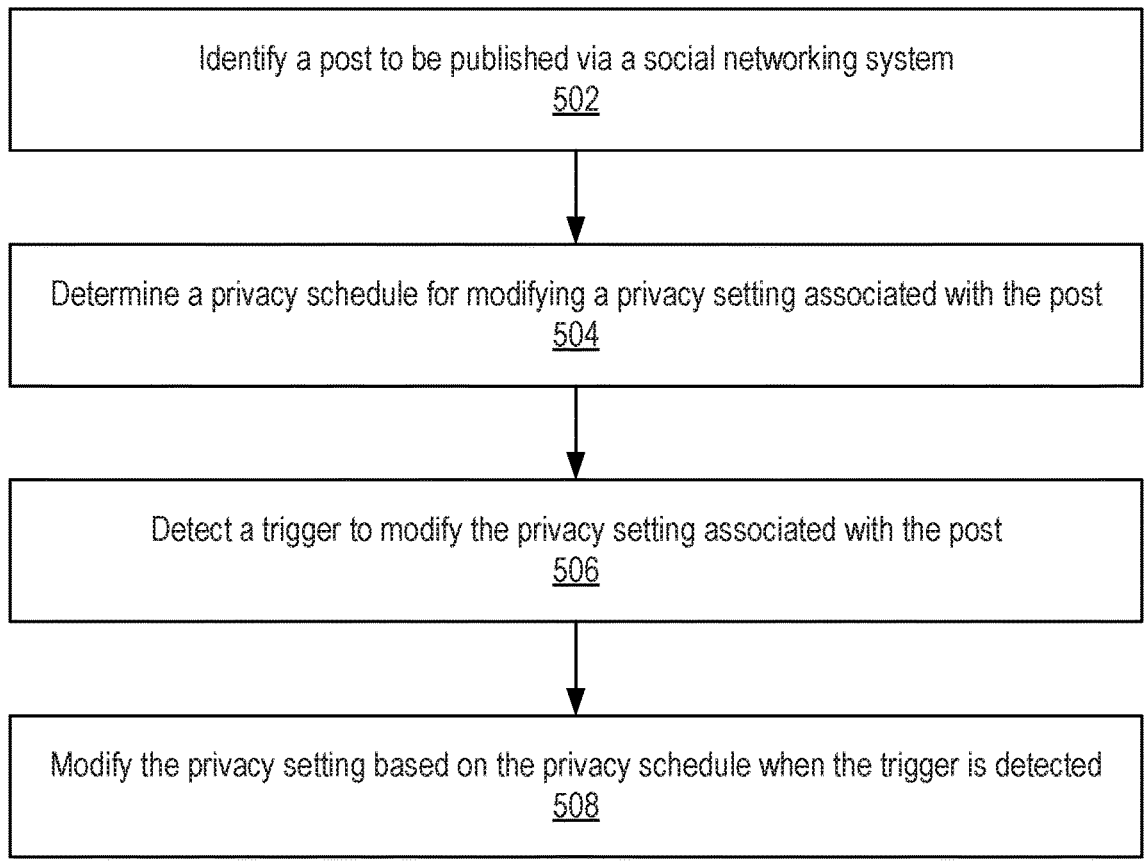
FIG. 5 illustrates an example method associated with providing trigger-based modification of privacy settings associated with posts, according to an embodiment of the present disclosure.

FIG. 5 illustrates an example method 500 associated with providing trigger-based modification of privacy settings associated with posts, according to an embodiment of the present disclosure. It should be appreciated that there can be additional, fewer, or alternative steps performed in similar or alternative orders, or in parallel, within the scope of the various embodiments unless otherwise stated.

At block 502, the example method 500 can identify a post to be published via a social networking system. At block 504, the example method 500 can determine a privacy schedule for modifying a privacy setting associated with the post. At block 506, the example method 500 can detect a trigger to modify the privacy setting associated with the post. At block 508, the example method 500 can modify the privacy setting based on the privacy schedule when the trigger is detected.

Figure 6:
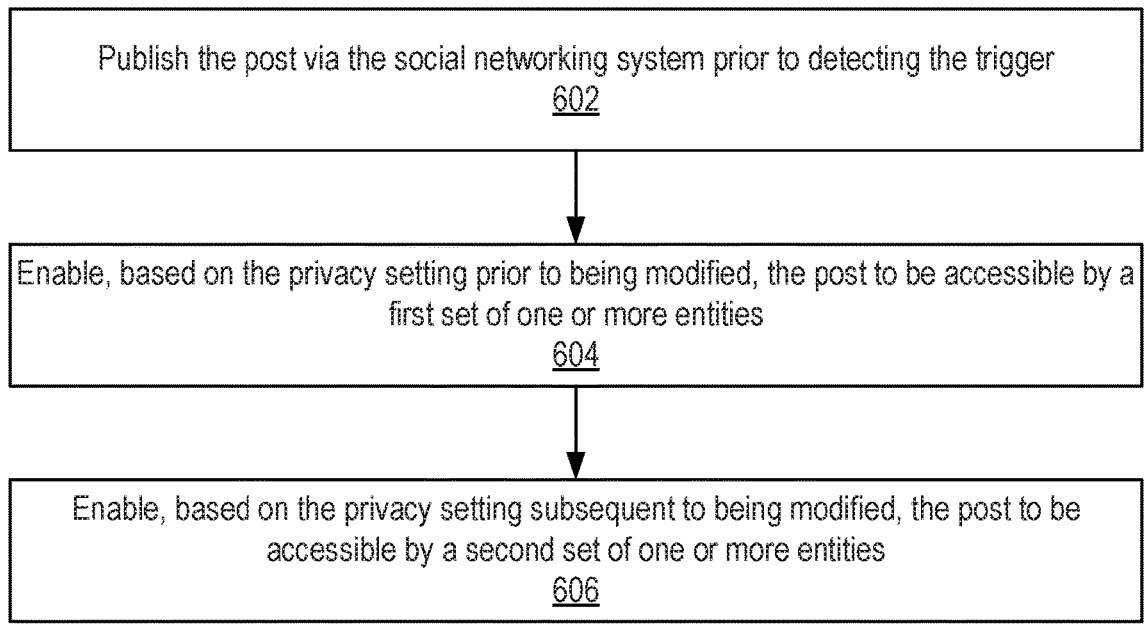
FIG. 6 illustrates an example method associated with providing trigger-based modification of privacy settings associated with posts, according to an embodiment of the present disclosure.

FIG. 6 illustrates an example method 600 associated with providing trigger-based modification of privacy settings associated with posts, according to an embodiment of the present disclosure. As discussed, it should be understood that there can be additional, fewer, or alternative steps performed in similar or alternative orders, or in parallel, within the scope of the various embodiments unless otherwise stated.

At block 602, the example method 600 can publish the post via the social networking system prior to detecting the trigger. At block 604, the example method 600 can enable, based on the privacy setting prior to being modified, the post to be accessible by a first set of one or more entities. The first set can be defined based on the privacy schedule. At block 606, the example method 600 can enable, based on the privacy setting subsequent to being modified, the post to be accessible by a second set of one or more entities. The second set can be defined based on the privacy schedule.

It is contemplated that there can be many other uses, applications, features, possibilities, and/or variations associated with the various embodiments of the present disclosure. For example, in some instances, users can choose whether or not to opt-in to utilize the disclosed technology. The disclosed technology can, for instance, also ensure that various privacy settings and preferences are maintained and can prevent private information from being divulged. In another example, various embodiments of the present disclosure can learn, improve, and/or be refined over time.

Social Networking System—Example Implementation

Figure 7:
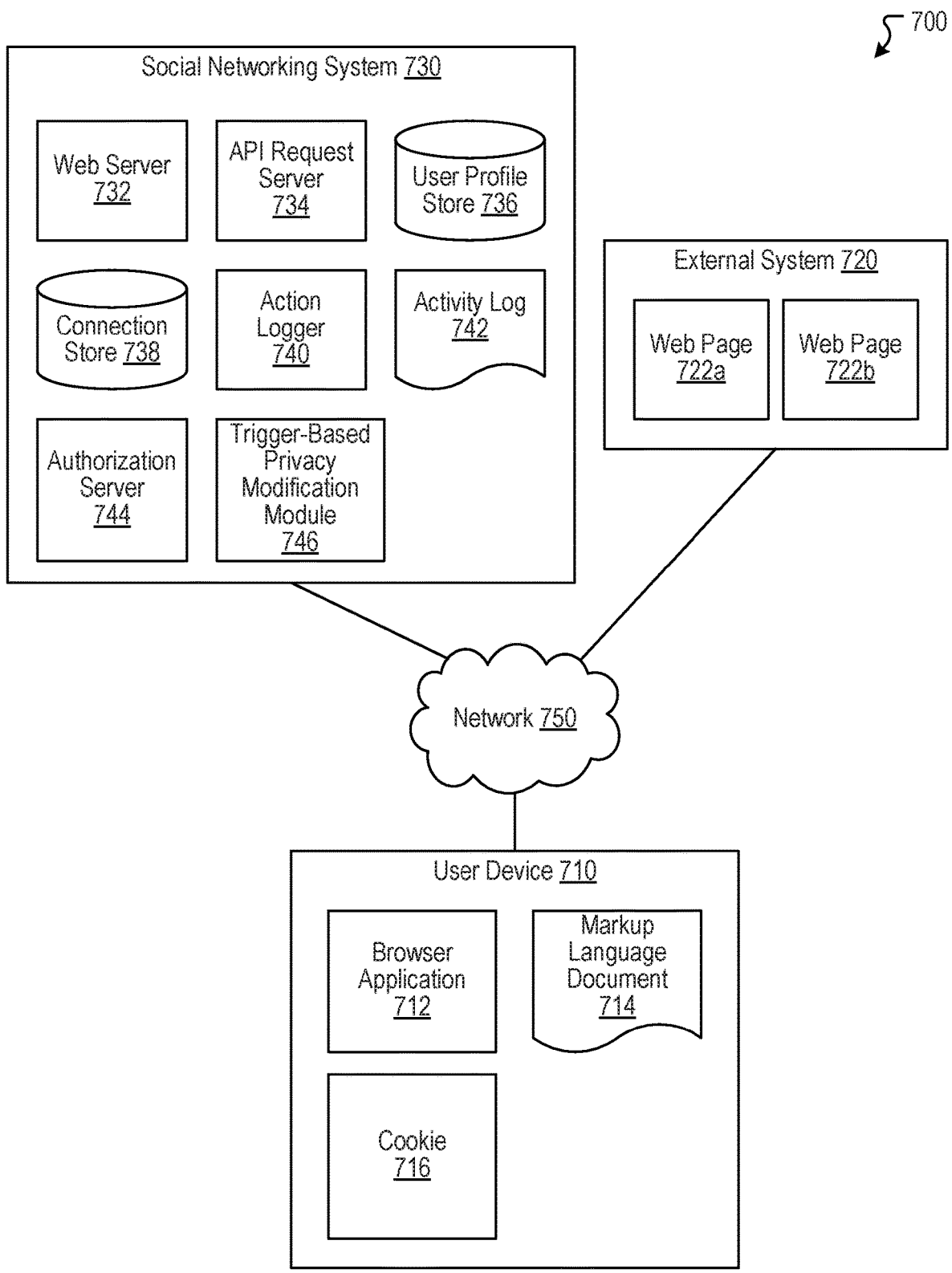
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the Silverlight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722*a* within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include a trigger-based privacy modification module 746. The trigger-based privacy modification module 746 can, for example, be implemented as the trigger-based privacy modification module 102 of FIG. 1. As discussed previously, it should be appreciated that there can be many variations or other possibilities. For example, in some instances, the trigger-based privacy modification module (or at least a portion thereof) can be included or implemented in the user device 710. Other features of the trigger-based privacy modification module 746 are discussed herein in connection with the trigger-based privacy modification module 102.

Hardware Implementation

Figure 8:
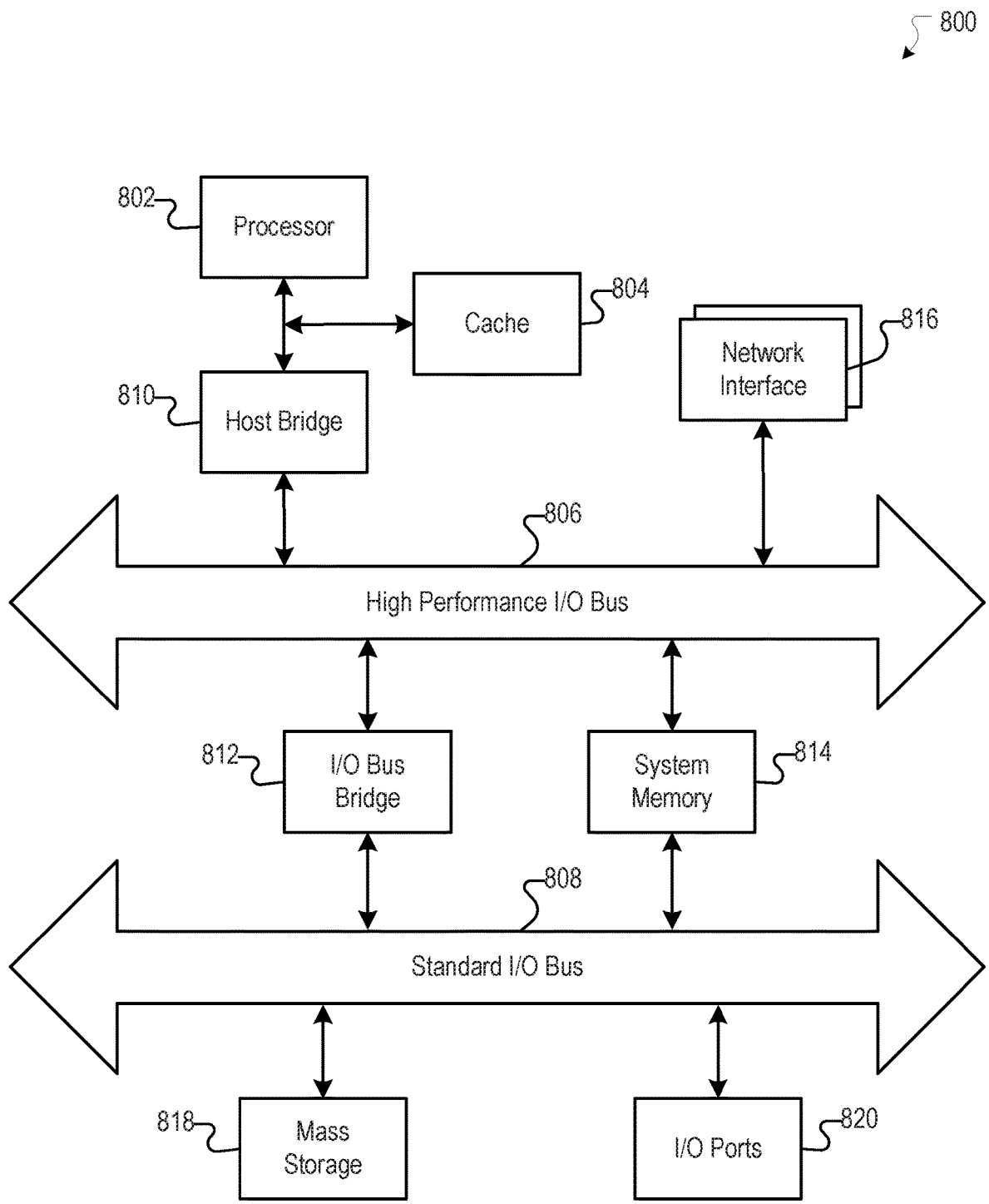
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments. Furthermore, reference in this specification to "based on" can mean "based, at least in part, on", "based on at least a portion/part of", "at least a portion/part of which is based on", and/or any combination thereof.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing system, a privacy schedule for a content item, the privacy schedule specifying at least:
   a first audience that will be initially allowed access to the content item,
   one or more criteria for modifying at least one privacy setting associated with the content item, and
   a second audience that will be allowed access to the content item subsequent to the at least one privacy setting being modified,
   wherein inclusion of an entity in at least one of the first audience or the second audience is based on one or more engagement signals between the entity and a posting user of the content item satisfying a threshold;
   determining, by the computing system, the one or more criteria for modifying the at least one privacy setting associated with the content item is satisfied; and
   applying, by the computing system, a modification to the at least one privacy setting associated with the content item.

2. The computer-implemented method of claim 1, wherein the one or more criteria for modifying the at least one privacy setting for the content item includes at least one time-based trigger.

3. The computer-implemented method of claim 2, wherein the one or more criteria includes a first time-based trigger that specifies a first duration of time after which a first modification is applied to the privacy setting for the content item.

4. The computer-implemented method of claim 3, wherein the one or more criteria includes a second time-based trigger that specifies a second duration of time after which a second modification is applied to the privacy setting for the content item.

5. The computer-implemented method of claim 1, wherein the one or more criteria for modifying the at least one privacy setting for the content item includes at least one event-based trigger.

6. The computer-implemented method of claim 5, wherein the event-based trigger corresponds to at least one of a relationship status update of the posting user of the content item, the posting user graduating from school, beginning or ending a school application period, beginning or ending a job application period, or a customized event created by the posting user.

7. The computer-implemented method of claim 1, wherein a second number of users included in the second audience is less than a first number of users included in the first audience.

8. The computer-implemented method of claim 1, wherein a second number of users included in the second audience is greater than a first number of users included in the first audience.

9. The computer-implemented method of claim 1, wherein the second audience is limited to the posting user of the content item.

10. A system comprising:
at least one processor; and
a memory storing instructions that, when executed by the at least one processor, cause the system to perform:
determining a privacy schedule for a content item, the privacy schedule specifying at least:
a first audience that will be initially allowed access to the content item,
one or more criteria for modifying at least one privacy setting associated with the content item, and
a second audience that will be allowed access to the content item subsequent to the at least one privacy setting being modified,
wherein inclusion of an entity in at least one of the first audience or the second audience is based on one or more engagement signals between the entity and a posting user of the content item satisfying a threshold;
determining the criteria for modifying the at least one privacy setting associated with the content item is satisfied; and
applying a modification to the at least one privacy setting associated with the content item.

11. The system of claim 10, wherein the one or more criteria for modifying the at least one privacy setting for the content item includes at least one time-based trigger.

12. The system of claim 11, wherein the one or more criteria includes a first time-based trigger that specifies a first duration of time after which a first modification is applied to the privacy setting for the content item.

13. The system of claim 12, wherein the one or more criteria includes a second time-based trigger that specifies a second duration of time after which a second modification is applied to the privacy setting for the content item.

14. The system of claim 10, wherein the one or more criteria for modifying the at least one privacy setting for the content item includes at least one event-based trigger.

15. A non-transitory computer-readable storage medium including instructions that, when executed by at least one processor of a computing system, cause the computing system to perform a method comprising:
determining a privacy schedule for a content item, the privacy schedule specifying at least:
a first audience that will be initially allowed access to the content item,
one or more criteria for modifying at least one privacy setting associated with the content item, and
a second audience that will be allowed access to the content item subsequent to the at least one privacy setting being modified,
wherein inclusion of an entity in at least one of the first audience or the second audience is based on one or more engagement signals between the entity and a posting user of the content item satisfying a threshold;
determining the criteria for modifying the at least one privacy setting associated with the content item is satisfied; and
applying a modification to the at least one privacy setting associated with the content item.

16. The non-transitory computer-readable storage medium of claim 15, wherein the one or more criteria for modifying the at least one privacy setting for the content item includes at least one time-based trigger.

17. The non-transitory computer-readable storage medium of claim 16, wherein the one or more criteria includes a first time-based trigger that specifies a first duration of time after which a first modification is applied to the privacy setting for the content item.

18. The non-transitory computer-readable storage medium of claim 17, wherein the one or more criteria includes a second time-based trigger that specifies a second duration of time after which a second modification is applied to the privacy setting for the content item.

19. The non-transitory computer-readable storage medium of claim 15, wherein the one or more criteria for modifying the at least one privacy setting for the content item includes at least one event-based trigger.

\* \* \* \* \*